INVENTORS:
Hans-Peter Sigg
Christian Stoll

By *Irwin M. Aisenberg*
ATTORNEY 3,465,079
ANTIBIOTIC SL 1846
Hans-Peter Sigg, Binningen, and Christian Stoll, Basel, Switzerland, assignors to Sandoz Ltd. (also known as Sandoz A.G.), Basel, Switzerland
Continuation-in-part of abandoned application Ser. No. 598,089, Nov. 30, 1966. This application June 19, 1967, Ser. No. 647,132
Claims priority, application Switzerland, Dec. 6, 1965, 16,789/65
Int. Cl. A61k 21/00; C07g 11/00
U.S. Cl. 424—122                3 Claims

ABSTRACT OF THE DISCLOSURE

SL 1846 is an antibiotic prepared by cultivating a new strain Pseudeurotium ovalis Stolk in a nutrient solution. The antibiotic is useful in inhibiting the proliferation of tumor cells in vitro and alleviating amebiasis.

---

Figure 1:
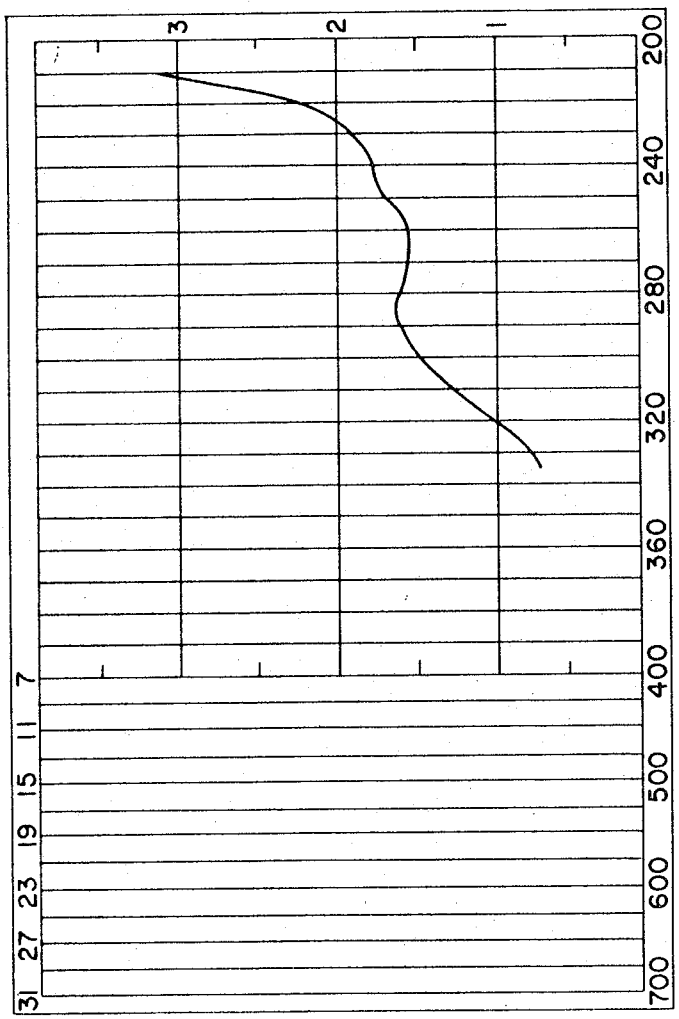

This application is a continuation-in-part of application Ser. No. 598,089 filed Nov. 30, 1966, now abandoned.

The present invention relates to a new antibiotic and a process for its production.

The present invention provides a new antibiotic, hereinafter named SL 1846.

The present invention further provides a process for the production of SL 1846, characterized in that a hitherto unknown strain of the fungus species Pseudeurotium ovalis Stolk is cultivated in a nutrient solution and the antibiotic is isolated from the culture filtrate and purified in manner known per se, e.g. by extraction or adsorption.

The new strain of Pseudeurotium ovalis Stolk used in accordance with the invention was isolated from a soil sample (Rio de Janeiro) and a specimen thereof has been deposited with the United States Department of Agriculture (Northern Utilization Research and Development Division), Peoria, Ill., under the reference NRRL 3194.

The new strain of the fungus species Pseudeurotium ovalis Stolk corresponds morphologically to the description given by A. C. Stolk, Antonie van Leeuwenhoek 21 (1955) and C. Booth, Mycological Papers No. 83 (1961).

It grows at 27° C. on malt-yeast extract agar with a compact, flat, grey-rose colored aerial mycelium. The cleistothecia develop on the substraum mycelium and are covered by aerial mycelium. They are round, red-brown and have a diameter of 90 to 180μ. The transient asci measure 7.5–9 x 6.5–8μ. They contain eight elliptical, flat, light brown or olive colored ascospores, measuring 5.5–6 x 3.5–4μ. The Sporotrichum-like secondary fruit form develops simultaneously with the main fruit form.

It is also possible to produce the new antibiotic SL 1846 using strains which may be obtained from the above-mentioned strain of Pseudeurotium ovalis Stolk, for example, by selection or mutation by ultraviolet or X-ray irradiation or other measures, for example by treatment of laboratory cultures with suitable chemicals.

The new strain of Pseudeurotium ovalis Stolk may be cultivated on various nutrient media containing the usual nutrients. Suitable nutrients for this fungus strain are, for example, nutrients normally used for carbon-heterotrophic organisms; specific examples of the carbon source are glucose, starch, dextrin, lactose and cane sugar; organic or inorganic nitrogen containing compounds may be used as the nitrogen source, specific examples being peptone, yeast and meat extracts, ammonium sulfate, ammonium nitrate and amino acids; the usual mineral salts and trace elements are also suitable for use in the nutrient.

One method of producing the antibiotic SL 1846 consists of inoculating a liquid nutrient medium with conidia or mycelia of the new strain of Pseudeurotium ovalis. The cultivation is, for example, effected under aerobic conditions, in static surface culture or in submerged culture while shaking or in fermenters while aerating with air or oxygen while stirring. The incubation temperature is between 20° and 35° C. It is preferred to use a temperature between 25° and 30° C. and a pH value of 5 to 7, in which case the culture is incubated for 4 to 10 days.

One especially suitable method for isolating the antibiotic of the present invention is extraction of the culture filtrate with ethylene chloride, though other organic solvents, e.g. benzene, ethyl acetate, butyl acetate, chloroform or butanol, may also be used. Subsequently the extracts are separated from the solvent, e.g. by distillation, and the residue purified chromatographically by adsorbing agents, e.g. activated alumina, silica gel or magnesium silicate, or by means of counter current distribution, in order to isolate the desired antibiotic.

The antibiotic SL 1846 has the following characteristics:

SL 1846 is a colorless, crystalline neutral compound having the formula $C_{16}H_{24}O_5$, a melting point of 89- to 92° C. and a specific rotation of $[\alpha]_D^{20} = -117°$ (c.=0.40 in chloroform).

Ultraviolet spectrum: maximum at 284.5 mμ (log ϵ=1.63) and a strong final absorption at 210 mμ (log ϵ=3.1) (in methanol) (FIGURE 1).

Figure 2:
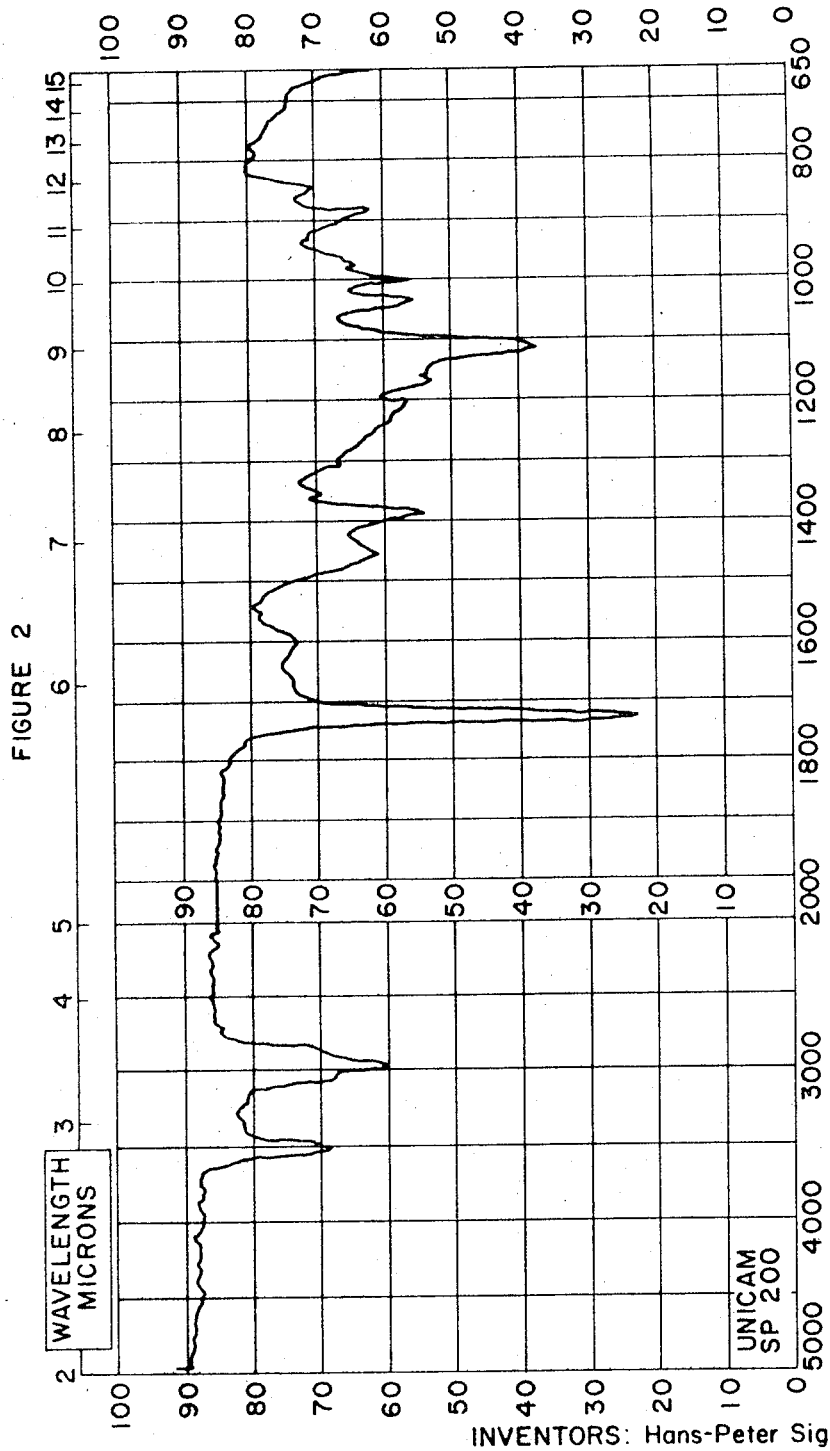

Infrared spectrum: bands at 3500, approximately 3000, 1725, 1600, 1460, 1390, 1120, 1040, 1030, 1000, 970, 880, 840 cm.$^{-1}$ (in methylene chloride) (FIGURE 2).

Solubility: insoluble in diethyl ether, ethylenechloride, ethyl acetate and other organic solvents, as well as water.

Mass spectrum: $M^+ = 296$ m/e; peaks at 126 m/e, 69 m/e, 55 m/e and 43 m/e.

Derivatives: 2,4-dinitrophenyl hydrazone having a melting point of 200°–203° and a formula $C_{22}H_{28}O_8N_4$.

The antibiotic SL 1846 inhibits the proliferation of tumor cells, as evidenced in vitro with cells of the mouse mastocytoma P–815, which cells (in a suitable nutrient solution) increase from 4 to 5 times their initial number within 40 hours. The DE–50 (concentration which inhibits the increase by 50%) of SL 1846 towards these cells in $10^{-9}$ g./ml.

The antibiotic SL 1846 also is useful in mamals for its specific amebostatic effect, especially towards histolytic Entamoeba, such as Entamoeba histolytica. The acute toxicity of SL 1846 in white mice is reflected by its $DL_{50}$, which is greater than 160 mg./kg. i.p.

The antibiotic SL 1846 is useful as a pharmaceutical for mammals on its own, either in pure crystalline or amorphous form or as crude concentrate, or in the form of appropriate medicinal preparations for administration, e.g. orally, enterally or parenterally.

A suitable daily dose of the antibiotic of this invention is from 0.5 to 1.5 milligrams per kilogram of body weight, e.g. from 30 to 1000 milligrams. Administration is, preferably, in a single daily dose.

In order to produce suitable medicinal preparations, the antibiotic is worked up with inorganic or organic adjuvants which are inert and physiologically acceptable. Examples of such adjuvants are:

For tablets and dragees --- Lactose, starch, talc and stearic acid.
For syrups --------------- Solutions of cane sugar, invert sugar and glucose.
For injectable solutions --- Water, alcohols, glycerin and vegetable oils.
For suppositories -------- Natural or hardened oils and waxes.

The preparations may furthermore contain suitable preserving, stabilizing and wetting agents, solubilizers, sweetening and coloring substances and flavorings.

In the following non-limitative examples all temperatures are indicated in degrees centigrade. The melting points were determined on a Kofler block.

Example 1

100 liters of a nutrient solution containing:

| | G. |
|---|---|
| Glucose | 20 |
| Malt extract (Schweiz. Ferment AG) | 2 |
| Yeast extract (Bacto) | 2 |
| Peptone | 2 |
| $KH_2PO_4$ | 2 |
| $MgSO_4 \cdot 7H_2O$ | 2 |

Demineralized water to make up 1 liter.

are inoculated in a fermenter with 10 liters of a preculture of *Pseudeurotium ovalis*, strain NRRL 3194 and incubated at 27° for 111 hours while aerating (75 liters of air per minute) and stirring (150 revolutions per minute). The culture solution is filtered and the filtrate having a pH of 5 to 6 is extracted 3 times, each time with 50 liters of ethylene chloride. The ethylene-chloride extract is washed once with 5 liters of water, dried over magnesium sulphate and evaporated to dryness in a vacuum after filtration. The residue (one gram per 100 ml. of 99.5:0.5 chloroform/methanol) is chromatographed on 300 g. of silica gel (Merck 0.2–0.5 mm.). Elution is effected with choroform/methanol (99.5:05) fraction volumn 100 ml. Fractions 28 to 39 yield colorless, crystalline SL 1846, having a melting point of 89° to 92°, from diethyl ether/pentane.

The 10 liters of preculture of *Pseudeurotium ovalis* are produced with the same nutrient solution and under the same culture conditions as indicated in the above example.

Example 2

Tablets having the following composition:

| | Weight per tablet/mg. |
|---|---|
| SL 1846 | 0.300 |
| Talcum | 0.020 |
| Maize starch | 0.050 |
| Lactose | 0.110 |
| Gelatine | 0.010 |
| Stearic Acid | 0.010 |

+10% (for adjustment purposes upon drying of the granulate).

are prepared as follows:

Gelatine is dissolved in demineralised water while heating and added to a mixture of SL 1846, talcum, maize starch and lactose. The entire mixture is then kneaded until the mass is uniformly moist. The stearic acid is dissolved in 94% alcohol while heating on a water bath and thereafter added to the mixture. The composition is then granulated; pre-dried, broken, dried and tabletted.

What we claim is:

1. Antibiotic SL 1846 having the following characteristics: a colorless crystalline neutral compound having the formula $C_{16}H_{14}O_5$ a melting point of 89–92° C. and a specific rotation of $[\alpha]_D^{20} = -117°$ (c.=0.40 in chloroform) and showing the following bands in the ultraviolet and infrared spectra:

ultraviolet spectrum as shown in FIGURE 1: maximum at 284.5 m$\mu$ (log $\epsilon$=1.63) and a strong final absorption at 210 m$\mu$ (log $\epsilon$=3.1) (in methanol);

infrared spectrum as shown in FIGURE 2: bands at 3500, approximately 3000, 1725, 1600, 1460, 1390, 1120, 1040, 1030, 1000, 970, 880, 840 cm.$^{-1}$ (in methylene chloride).

2. A pharmaceutical composition consisting essentially of a therapeutically effective amount of the antibiotic of claim 1 and physiologically acceptable, non-toxic, inert carrier.

3. A pharmaceutical composition as claimed in claim 2, in which the amount of the antibiotic of claim 1 present is suitable for the administration of a daily dose of 30 to 1000 mg.

References Cited

UNITED STATES PATENTS 3,334,015  8/1967  Schmitz _____ 167—65

ALBERT T. MEYERS, Primary Examiner

JEROME D. GOLDBERG, Assistant Examiner